United States Patent [19]

Davidson

[11] 4,254,999

[45] Mar. 10, 1981

[54] DIE SHOES WITH STANDARD INTERCHANGABLE COMPONENTS AND METHOD FOR INTERCHANGABILITY

[76] Inventor: James D. Davidson, 67 Grantour Ct., Pontiac, Mich. 48055

[21] Appl. No.: 72,142

[22] Filed: Sep. 4, 1979

[51] Int. Cl.³ ........................ F16C 29/02; F16C 29/12

[52] U.S. Cl. .................................... 308/3 A; 308/3 R

[58] Field of Search ................ 308/3 A, 3 R, 3.9, 3.6, 308/6 R; 408/234

[56] References Cited

U.S. PATENT DOCUMENTS

| | | | |
|---|---|---|---|
| 3,178,240 | 4/1965 | Davidson | 308/3 R |
| 4,168,927 | 9/1979 | Moyer | 308/3 A |

*Primary Examiner*—Lenard A. Footland

[57] ABSTRACT

The purpose of this invention is to standardize die shoes, which are the upper and lower portions of a fabrication die that supports the working portion of a die and punch. They are also used to mount the die into the stamping press. Standardization would reduce the die shoes into standard re-usable components which could be used year after year, which would reduce waste of material, plus allow interchangability between dies. Also, standardization will allow die shoes that can be changed to a larger shut height to suit larger die construction or larger presses. This feature will eliminate extra plates being added to dies when it is necessary to change the die to a larger press, which will improve safety. Standardization of die shoes amounts to breaking down the die shoes as commonly designed into standard components which can be reused and interchanged from die to die, press to press, year after year.

14 Claims, 9 Drawing Figures

DIE SHOES WITH STANDARD INTERCHANGABLE COMPONENTS AND METHOD FOR INTERCHANGABILITY

STATEMENT OF PRIOR ART

U.S. Pat. No. 3,178,240 reversible heel blocks, commonly called wear plates.

BRIEF SUMMARY OF INVENTION

This invention relates to die construction and particular to die shoe construction which consists normally of castings poured to suit a given type die such as draw dies, form dies, pierce dies, spank dies, trim dies or a combination thereof. Most die shoes are an integral part of the working die and usually are designed to suit a given die problem and given mechanical press size without interchangability being considered, or re-use being designed into the upper or lower die shoe. If re-use is considered, little attention is given to interchangable components such as heel posts made from castings or the like, wear plate housings made from castings or the like, and interchangable reversible wear plates. This invention addresses the problem of standardization and interchangability of components between dies, die shoes and different mechanical press sizes.

The important object of this invention is standardization of die shoes and die shoe components, and a further object is to provide a means to have component interchangability between dies or between different press sizes, etc.

The object of standardization is to disassemble the die shoe castings as normally constructed and provide flat base plates for the lower shoe and upper shoe; with standard wear plate housings for lower plate, and standard level post components for the upper plate and means to fasten said components in a precision alignment maintaining all component centerlines in a parallel mode and/or 90 degree mode to each other. A further object is to use standard reversible wear plate which are easily replaced when both sides of wear plates are scored or damaged beyond further use.

A further object is to provide a means to repair a broken component by actually replacing said component with a new component from inventory. Another further object is to reduce millions of large machine hours now used to machine individual components, and a further object would be to reduce design and engineering time now used to design a given die. The designer could check in a standard catalogue to pick out die shoe components such as standard lower and upper shoe flat base plates or lower die riser plates, upper punch adaptor plates, since heel post with single wear plate housing or double heel post component with double wear plate housing; or, add heel post spacers to change shut heights of dies to suit a given press size etc. A further object is to improve press room safety. Presently dies are moved from press size to press size by adding plates to the top or bottom of the die and sometimes both, which at best must be done very carefully to be sure all bolts and nuts are fastened tightly, and enough are used. These plates make the die set very dangerous and much care must be given to stacking such dies in die strong. This invention would eliminate these problems and improve safety. A further object would be to reduce cast iron or cast steel now used in die punches or die castings by using standard punch adaptor plates or die riser plates. Said plates would be standard and re-usable, die program to die program, from die to die, year to year. A further object would be the ability to purchase components which could be shelf items and once purchased could be given property numbers and placed in computer storage, be easily transfered from plant to plant, or broken down to standard components, to be salvaged and stored until needed. The prime object of this invention becomes obvious if one visits a large auto manufacture metal fabricating plant and observes the die storage areas at the rear of most plants. One would observe millions and millions of pounds of cast iron or cast steel dies or die shoes that in most cases are eventually defaced with cutting torches and sold as scrap. Such waste could be avoided with this invention, and standard shoes with interchangable components which could be re-used year after year.

Standardization of die shoe with interchangable components would reduce the billions and billions of BTU'S now used in energy to reduce the scrap to molten metal to be repoured each year into more die shoe castings, plus it would reduce the billions and billions of BTU'S now used in energy to re-machine these new castings each year. Standard die shoes with interchangable components would reduce millions of man hours now used in the tooling industry and reduce overtime, which comtributes greatly to inflation. This invention would standardize die shoes and help our country's energy conservation program.

SUMMARY OF OBJECTIVES OR THE INVENTION

1. Standardization of component part of upper and lower die shoes.
2. Interchangable components from die to die.
3. The change of the shut height of shoes by use of spacers under heel post components or under wear plate housings or both.
4. Reduction of material used in castings for die punches and lower die castings with the use of riser or adaptor plates.
5. Improvement of press room die set safety due to the elimination of extra plates being added to die shoes if the die is placed in a larger press.
6. Improvement of safety in die storage areas.
7. Reduction of man hours in tooling programs.
8. Reduction of machine time required in tooling programs.
9. Reduction of design time of the die program because all die shoes would be standard, with interchangable components, cataloged etc.
10. Reduction in cost of tooling because the shoes and components can be salvaged and stored for re-use.
11. Reduction in down time if a component is damaged, because it can be easily replaced from inventory.
12. Reduction in energy used in tooling programs.

DETAILED DESCRIPTION

Reference is now made in greater detail to the drawings which are illustrative only, and where like elements or components are designated by the same reference nunerals.

Figure 1:
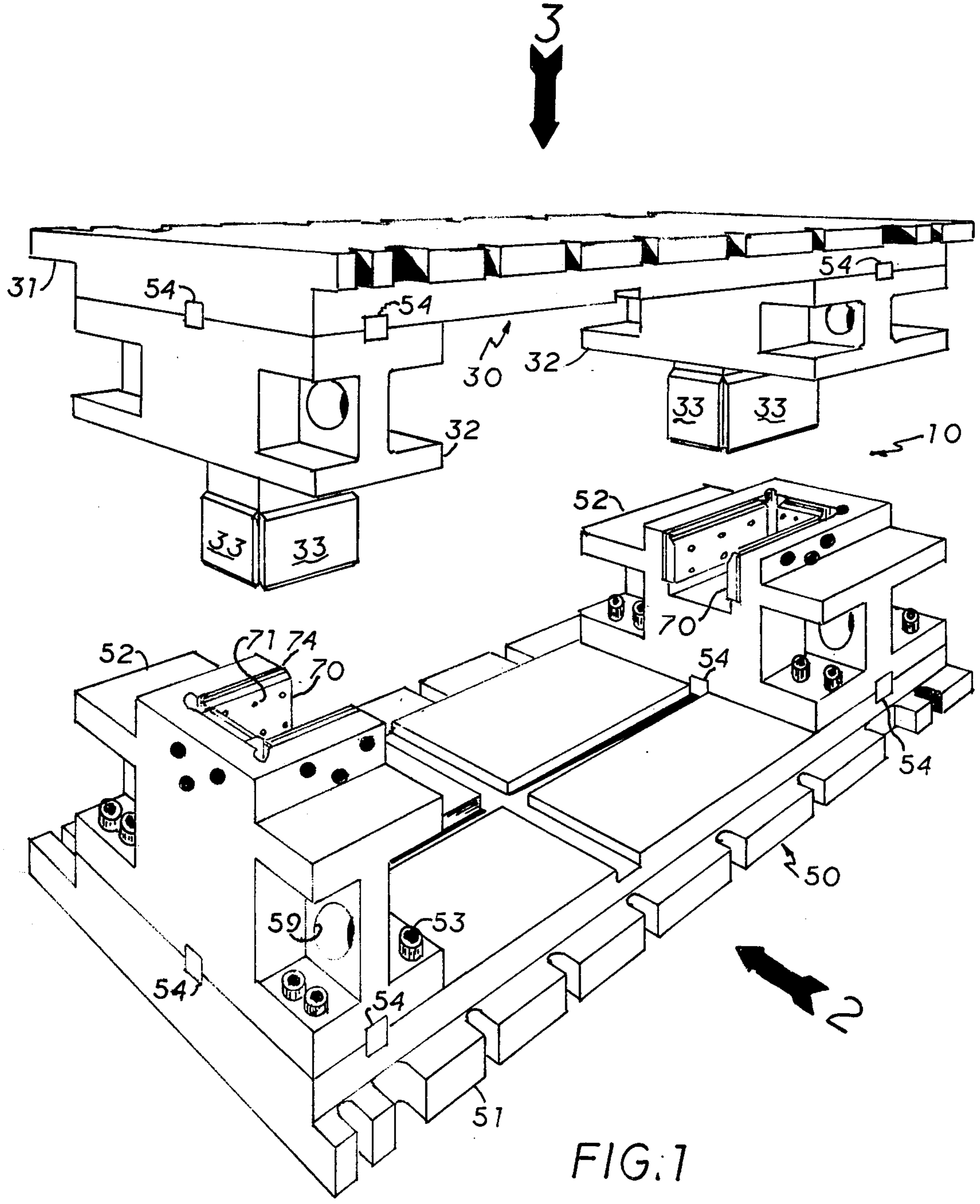
FIG. 1 is a perspective view of upper and lower shoes with assembled components with top shoe in a exploded mode.

FIG. 1 is a perspective view of die shoe construction 10 with the upper die shoe combination 30 in an exploded mode in relationship to lower die shoe combination 50, where the upper die shoe combination comprises level post components 32 and flat upper base plate 31, which are maintained in a stationary mode of precision alignment with metal fasteners such as socket head cap screws 53 and square cross keys 54. Lower die shoe combination 50 comprises a flat base plate 51 and two wear plate housings 52 which are maintained in a stationary mode of precision alignment with metal fasteners such as socket head cap screws 53 and cross keys 54. When the upper shoe combination 30 is allowed to enter the lower die shoe combination 50, machine surface 33 will make contact with the reversible wear plates 70. Surfaces 71 and 33 are machined to maintain precision alignment between the upper shoe 30 and the lower shoe 50.

Figure 2:
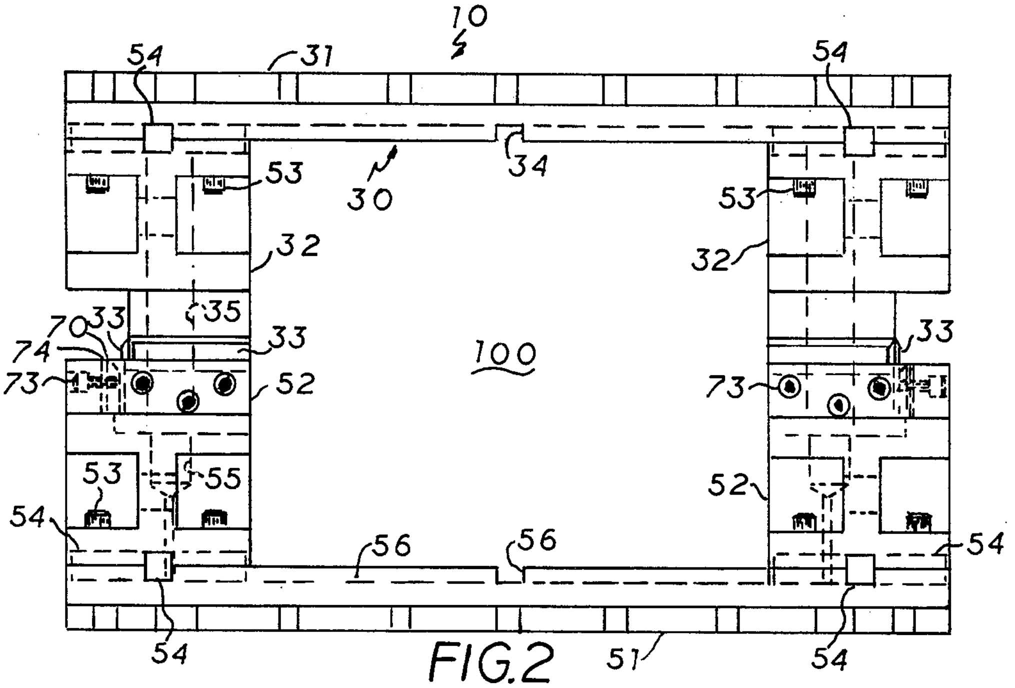
FIG. 2 is a view taken in the direction of arrow 2, FIG. 1 which is a typical side view of die shoes in the closed mode.

FIG. 2 is a side view taken in the direction of arrow 2 of FIG. 1, which demonstrates die shoes 10 in a closed mode. Machined surface 33 of heel post component 32 is entered into wear plate housing 51 and maintained in precision alignment by reversible wear plates 70. All components can be produced from cast iron or cast steel or the like. Further shown is means of maintaining said components in a stationary mode of precision alignment, one to the other, using socket heat cap screw 53 or the like and cross keys 54.

Other means such as dowels, shrink rods, etc. could be used. Further shown are pre-drilled guide pin holes 55 in the lower wear plate housing 52 and guide pin hole 35 in the upper level post component 32. Further shown is a means 73 of maintaining said reversible wear plates 70 in the wear plate housing 52. Also shown are pre-machined cross keyways 56 in lower shoe 51 and cross keys 34 in upper shoe 31, which can be made from cold roll steel or the like. Numeral 100 denotes a die work, area die is not shown.

Figure 3:
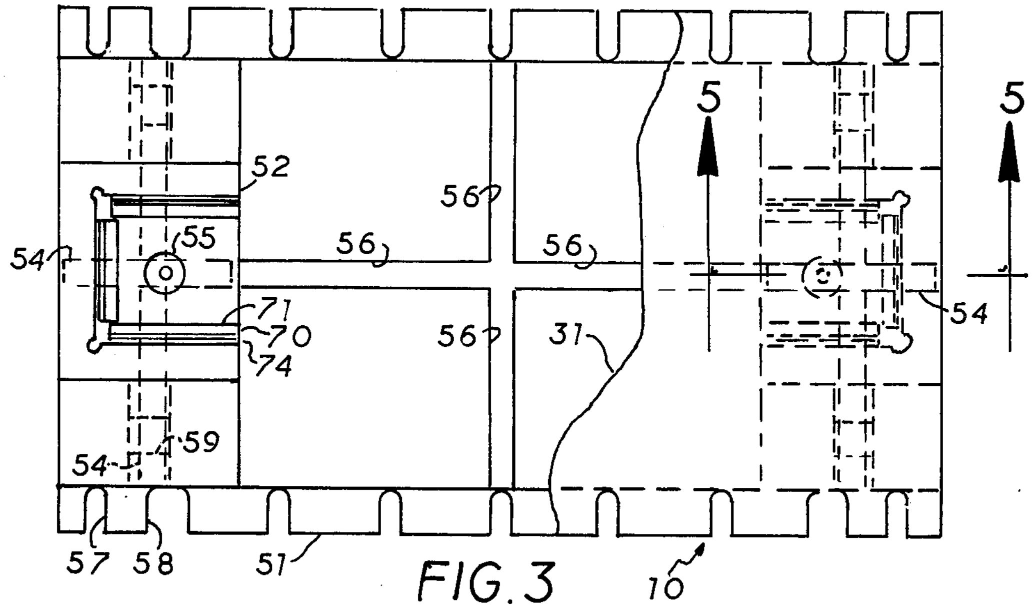
FIG. 3 is a view taken in the direction of arrow 3 of FIG. 1 which is a plan view with the top shoe partially removed to show the lower wear plate housing with reversible wear plates.

FIG. 3 is a plan view of die shoes 10 taken in the direction of arrow 3 of FIG. 1, which shows upper shoe 31 cut-away to illustrate reversible wear plates 70 with shim 74 which is described in the prior art statement. Further shown is wear plate housing 52 with chain holes 59 and cross keys 54. Also demonstrated are die bolts slots 57 and chain slots 58. Further shown are guide pin hole 55 and pre-machined cross keyways 56. It should be noted reversible wear plates 70 can be made from hardened tool steel, bronze alloy or the like. Shim 74 can be cold roll steel or the like.

Figure 4:
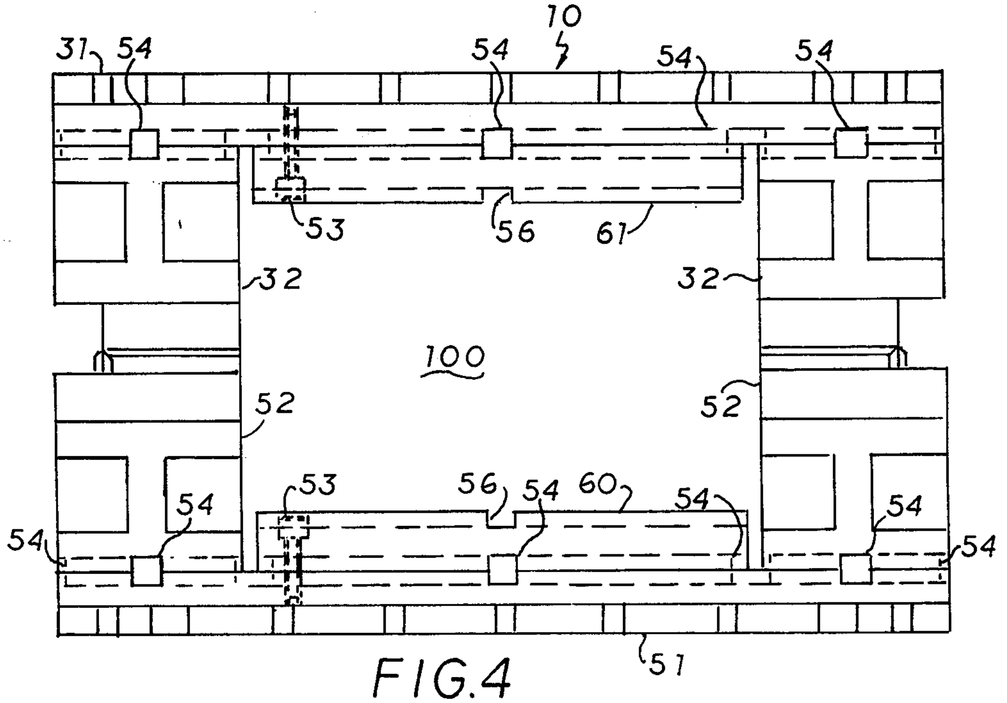
FIG. 4 is the same as figure two, which is a side view with a standard die riser plate and means to fasten to the lower shoe, and a standard punch adaptor plate and means to fasten the upper shoe.

FIG. 4 is the same as FIG. 2 except that die riser plate 60 and die punch adaptor plate 61 have been added. Plates 60 and 61 can be made from cast iron or cast steel or the like and will reduce the amount of material used to make the die punch and the lower die which are not shown in the drawings. In FIG. 1 through 9, plates 60 and 61 are maintained in a stationary mode of precision alignment to the respective die show base plates with socket head cap screws 53 and crosskeys 54 or the like. Further shown are cross keyways 56 in plates 60 and 61 which are used to align the die punch and lower die.

Figure 5:
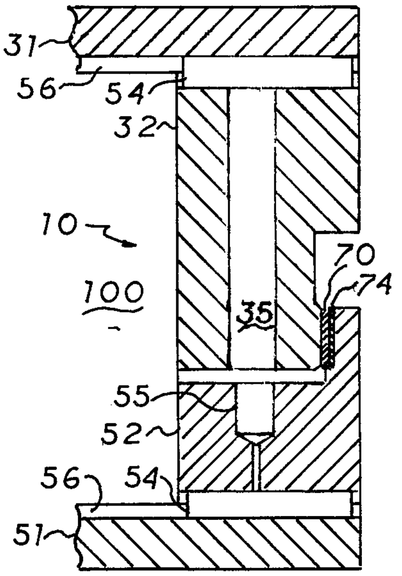
FIG. 5 shows a section taken on line 5—5 of FIG. 3, which shows components and means to fasten said components together, plus wear plates between the upper and lower shoes.
Figure 9:
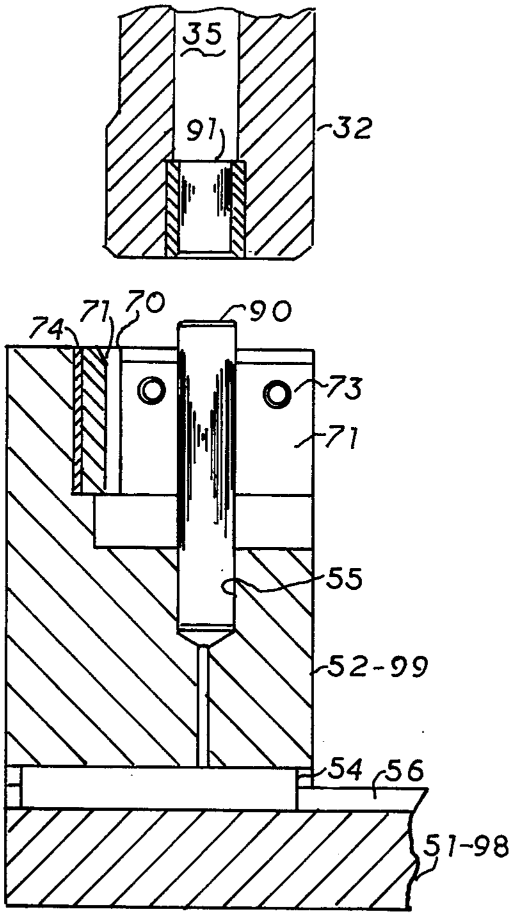
FIG. 9 is a typical section taken at line 9—9, FIG. 7 or FIG. 8, which shows guide pins when standard shoes are used for pierce dies or where a cutting die's upper heel post has been added to show a typical bronze bushing in the upper heel post casting.
Figure 7:
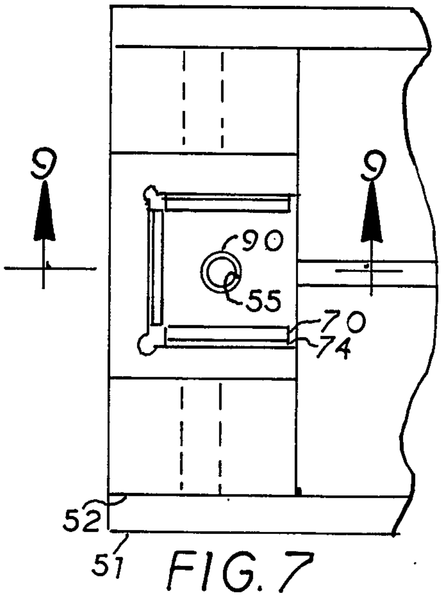
FIG. 7 shows a typical plan view of a single guide pin in conjunction with reversible wear plates.
Figure 8:
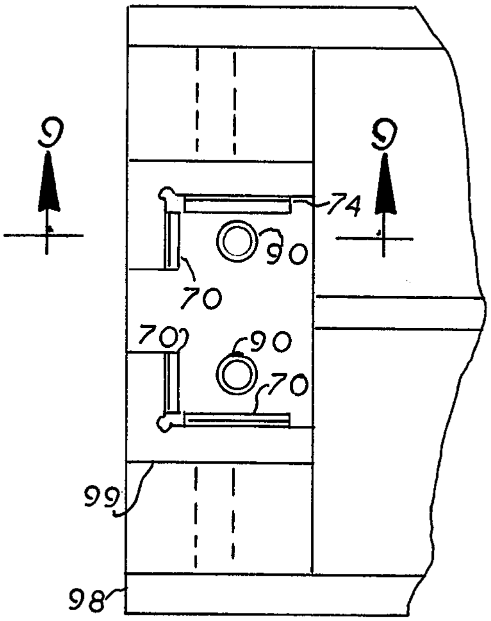
FIG. 8 shows a typical plan view when two guide pins are used at both ends of a die shoe in conjunction with a double wear plate housing component.

FIG. 5 is a section taken on line 5—5, FIG. 3, which shows how upper heel post 32 is entered into wear plate housing 52 and maintained in precision alignment in relationship with each other with reversible wear plates 70 and shim 74. Further shown are pre-drilled holes 55 and 35 which accommodate a guide pin if required, as shown in FIGS. 7, 8 & 9. Further shown are cross keys 54 which maintain precision alignment of all components to each other.

Figure 6:
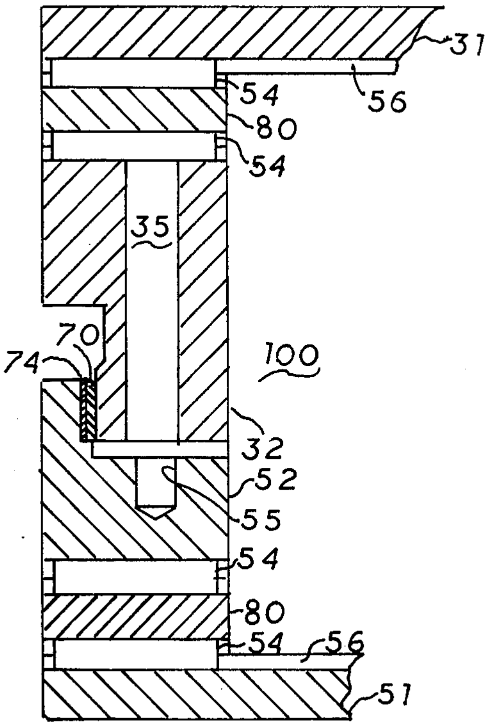
FIG. 6 is the same as FIG. 5 except the heel post components and wear plate housings have standard spacers under said components to enlarge the shut height of the die to suit a larger press size.

FIG. 6 is the same as FIG. 5 except that spacers 80 have been added which can be made from cast iron or cast steel or the like in standard increments in thickness which allow changing the die work area 100 to accept a higher die height and allow shoes to be used in a larger press size without adding special plates on die shoes to match the press shut height, which has been previously mentioned as unsafe.

FIG. 7 is a typical plan view of a lower die shoe 50 with reversible wear plates 70 and shim 74. Note that guide pin 90 has been added to add additional precision alignment when required, such as is needed in cutting and piercing dies.

FIG. 8 is the same as FIG. 7 except that additional reversible wear plates 70 and additional guide pins 90 have been added to improve the precision alignment of the upper and lower die which are not shown. It should be noted that wear plate housing 99 would be the same as housing 52 except wider to accommodate wider dies and wider presses. Further it should be noted plate 98 would be wider than plate 51 but still standard.

FIG. 9 is a typical section taken on line 9—9 of FIGS. 7 and 8, which shows guide pin 90 in lower wear plate housing 52 or 99.

Also shown are reversible wear plates 70, shim 74, metal fasteners 73, key 54, keyway 56 and die shoe base plate 51 or 98.

Further shown is upper heel post component 32 with a bronze bushing 91 in hole 35 to reduce wear.

I claim:

1. A die construction commonly called die shoes, consisting of a lower shoe combination and an upper shoe combination, comprising:

a lower shoe base plate;

at least one wear plate housing;

a means of maintaining said lower shoe components in a stationary mode of precision alignment;

an upper shoe base plate;

at least one heel post component;

a means of maintaining said upper shoe components in a stationary mode of precision alignment; and a means of maintaining said upper and lower shoe combinations parallel and in a mode of precision alignment.

2. A method of changing the shut height of a die construction as recited in claim 1, said method steps are as follows:

install a spacer therebetween said heel post component and said upper die shoe base plate; and a means of maintaining said spacer therebetween in a stationary mode of precision alignment.

3. A method of changing the shut height of a die construction as recited in claim 1, said method steps are as follows:

install a spacer therebetween said wear plate housing and said lower die shoe base plate; and a means of maintaining said spacer therebetween in a stationary mode of precision alignment.

4. A method of changing the shut height of a die construction as recited in claim 1, wherein the method steps are as follows:

install a spacer therebetween said upper heel post component and upper shoe base plate component;

install a spacer therebetween lower shoe wear plate housing and lower die shoe base plate component; and a means of maintaining said spacers therebetween in a stationary mode of precision alignment.

5. A die construction as recited in claim 1, comprising:

reversible wear plates and a means of fastening said wear plates into wear plate housing.

6. A standardized die construction as recited in claim 1, comprising:

a die riser plate and a means of maintaining precision alignment with lower base plate.

7. A standardized die construction as recited in claim 1, comprising:

a upper die punch adaptor plate and a means of maintaining precision alignment with upper base plate.

8. A standardized die construction as recited in claim 1, comprising:

A. a lower die riser plate;

B. a upper die punch adapter plate; and

C. a means of maintaining said plates in a stationary mode of precision alignment with upper & lower base plates.

9. A die construction as recited in claim 1 with a means of increasing shut height of shoes, comprising:

A. a wear plate housing, spacer, between said housing & lower die shoe base plate; and B. a means of maintaining said spacer in a stationary mode of precision alignment with wear plate housing & die shoe lower base plate.

10. A die construction as recited in claim 1 with means of increasing shut height of shoes, comprising:

A. a heel post component, spacer, between said component & upper die shoe base plate; and B. a means of maintaining said spacer in a stationary mode of precision alignment to heel post component and upper die shoe base plate.

11. A die construction as recited in claim 1 with means of increasing shut height of shoes; comprising:

A. a heel post component, spacer between said component and upper die shoe base plate;

B. a wear plate housing, spacer, between said housing & lower shoe base plate; and C. a means of maintaining said spacers in a stationary mode of precision alignment with said components & base plates.

12. A die construction as recited in claim 1, comprising; at least one guide pin, installed in said wear plate housing which enters precision slip fit hole in upper heel post component to improve precision alignment of die.

13. A die construction as recited in claim 1, comprising:

A. at least one guide pin in wear plate housing; and

B. at least one bushing in heel post component; to prevent unnecessary wear of said heel post component.

14. A die construction commonly called die shoes, comprising an upper die shoe combined with an improved lower die shoe combination, wherein the improvement comprises:

a lower die shoe base plate;

at least one interchangeable, removable wear plate housing; having wear plates installed therein; and a means of maintaining said components in a stationary mode of precision alignment.

* * * * *